(12) United States Patent
Valle

(10) Patent No.: US 6,641,495 B2
(45) Date of Patent: Nov. 4, 2003

(54) FRONT BICYCLE DERAILLEUR FORK AND DERAILLEUR COMPRISING SAID FORK

(75) Inventor: Maurizio Valle, Vicenza (IT)

(73) Assignee: Campagnolo Srl, Vicenza (IT)

( * ) Notice: Subject to any disclaimer, the term of this patent is extended or adjusted under 35 U.S.C. 154(b) by 0 days.

(21) Appl. No.: 09/951,548

(22) Filed: Sep. 14, 2001

(65) Prior Publication Data

US 2002/0034996 A1 Mar. 21, 2002

(30) Foreign Application Priority Data

Sep. 15, 2000 (IT) .................... TO2000A0870

(51) Int. Cl.⁷ .................................. F16H 61/00
(52) U.S. Cl. ........................... 474/80; 474/82
(58) Field of Search ................ 474/80, 82, 81, 474/78

(56) References Cited

U.S. PATENT DOCUMENTS

| 4,305,712 A | * | 12/1981 | Nagano | 474/82 |
| 5,624,336 A | * | 4/1997 | Kojima | 474/82 |
| 5,728,018 A | * | 3/1998 | Terada et al. | 474/80 |
| 5,779,581 A | * | 7/1998 | Fujii | 474/80 |

FOREIGN PATENT DOCUMENTS

| EP | 0545322 | * | 6/1993 | |
| FR | 1.118.883 | * | 3/1956 | 474/80 |
| FR | 2532608 | * | 3/1984 | |
| FR | 2621968 A3 | * | 4/1989 | |
| FR | 2797841 | * | 3/2001 | |

* cited by examiner

*Primary Examiner*—Marcus Charles
(74) *Attorney, Agent, or Firm*—Volpe & Koenig, P.C.

(57) ABSTRACT

Fork (4) of a bicycle front derailleur comprising an outer plate (6) and an inner plate (5), which are two separate elements made of different materials, the inner plate (5) being stiffer and made of a harder material and the outer plate (6) being made of a lighter material.

18 Claims, 2 Drawing Sheets

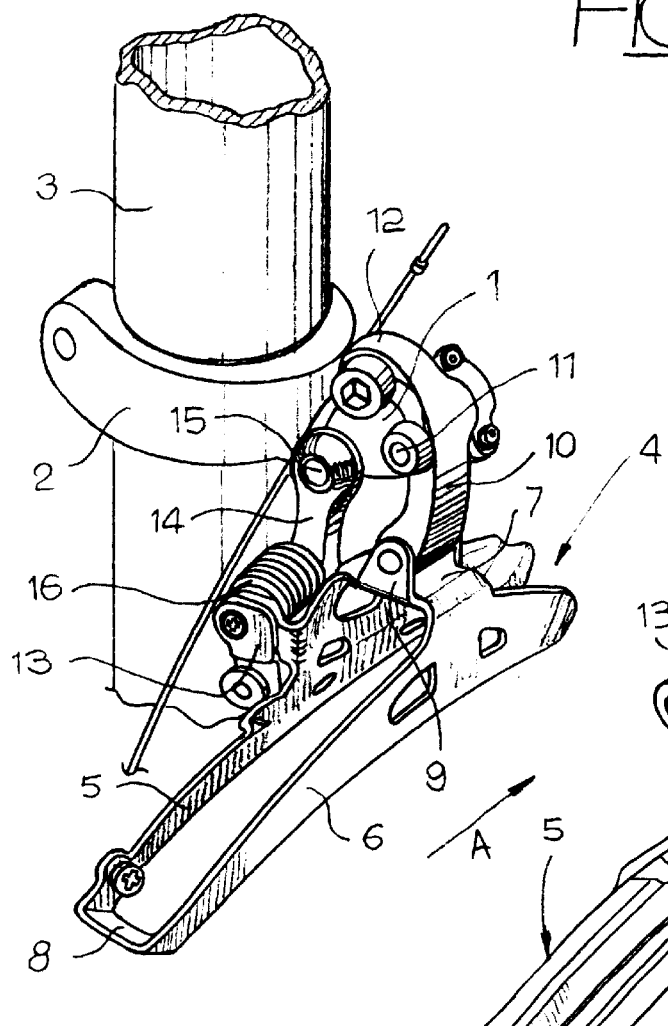
Fig_1
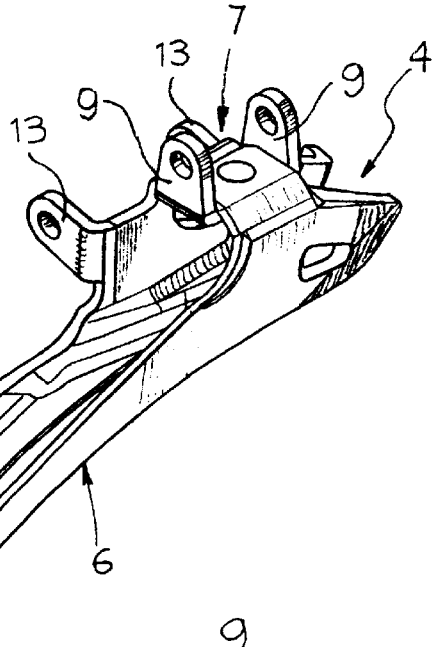
Fig_2
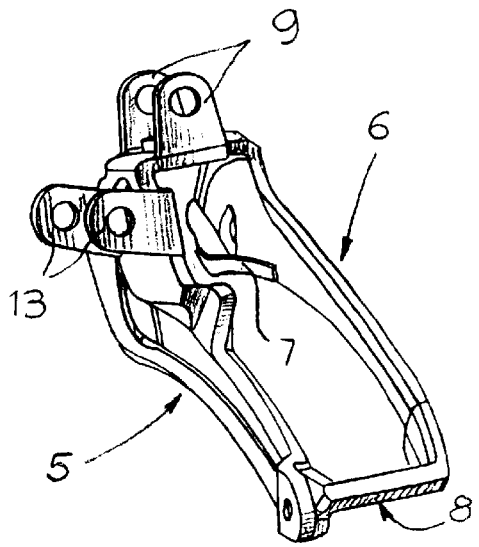
Fig_6

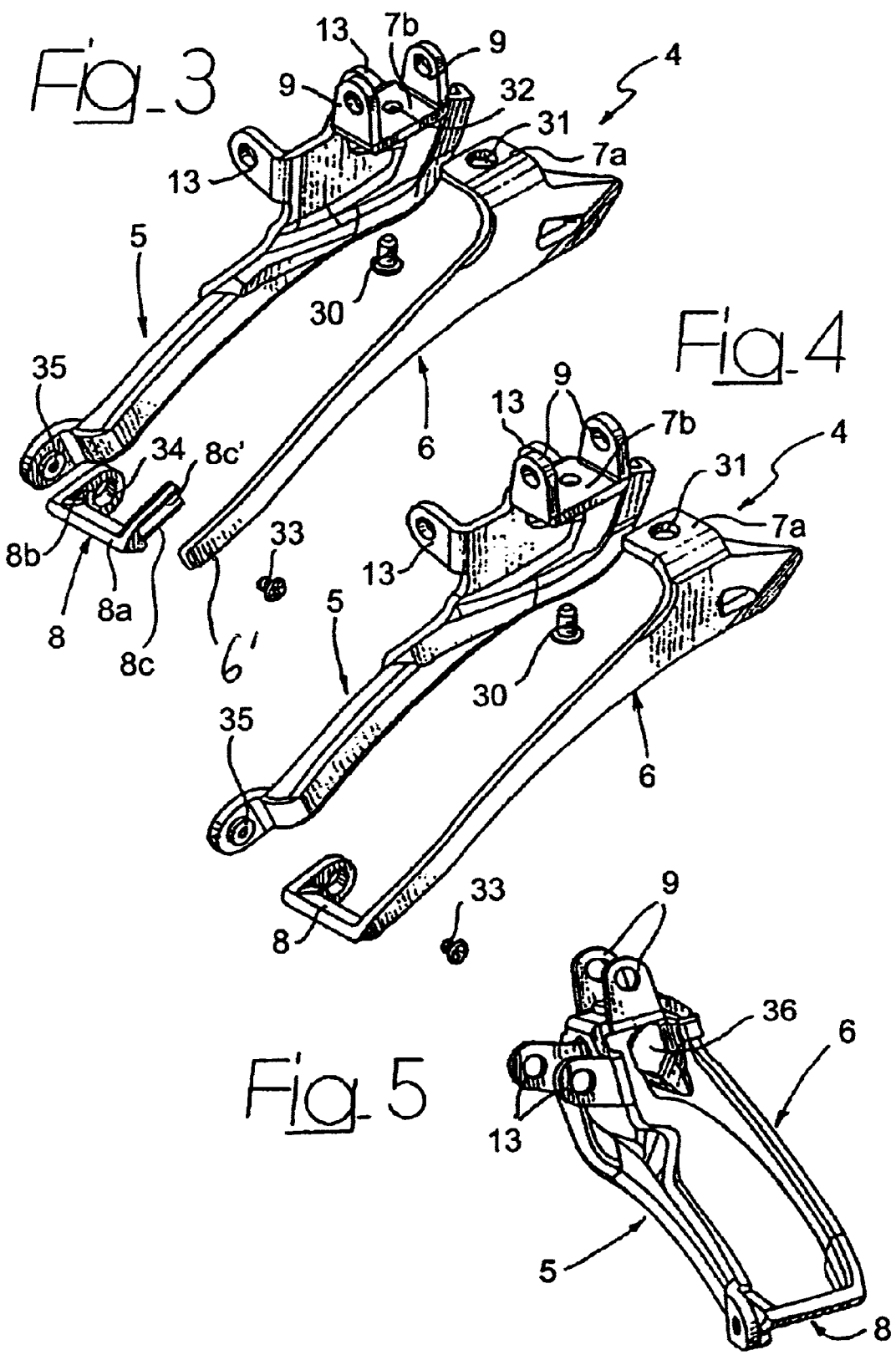

FRONT BICYCLE DERAILLEUR FORK AND DERAILLEUR COMPRISING SAID FORK

BACKGROUND OF THE INVENTION

This invention relates to a front bicycle derailleur fork for controlling the selective engagement of a transmission chain of a bicycle on a plurality of chainrings of different diameters associated to the bottom bracket of the bicycle, said fork comprising an inner plate and an outer plate, which is essentially parallel and distanced with respect to the inner plate, and joined to it by an upper bridge portion, said outer plate being located on the side of the larger diameter chainring and said inner plate being located on the side of the smallest diameter chainring.

FIG. 1 of the annexed drawings shows a perspective view of a front bicycle derailleur of the traditional type, comprising a fixed body 1 with a fork 2 for anchoring to a tube 3 of the bicycle frame near the bottom bracket. The derailleur 1 also comprises a fork 4 for controlling the selective engagement of the bicycle chain (not illustrated) on the chainring (not illustrated) associated to the bottom bracket. The fork 4 comprises an inner plate 5, closer to the bicycle frame, and an outer plate 6, facing outwards, which is parallel and distanced with respect to the plate 5. The two plates 5, 6 are connected by an upper bridge 7 and a rear bridge 8. The upper bridge 7 is provided with a pair of parallel tabs 9 for the articulated connection to a rocker arm 10, which is articulated to the fixed body 1 of the derailleur in point 11 and presents an opposite end 12 for anchoring the end of the derailleur actuating flexible wire (not illustrated). The inner plate 5 also presents a pair of parallel tabs 13 for the articulated connection to a second articulated arm 14, whose opposite end is connected in an articulated fashion to the fixed body 1 in point 15. The two arms 10, 14, consequently, define an articulated parallelogram connection, which allows the fork 4 to move with respect to the fixed body 1 in a direction which is essentially transversal with respect to the longitudinal direction of the bicycle, indicated by the arrow A. A spring 16, which tends to recall the fork 4 forwards an end of travel position (leftwards with reference to the drawing), is provided on the spindle of the inner plate 4 and the arm 14. From this position, the fork can be moved rightwards (always with reference to FIG. 1) following the intervention of a derailleur control (not illustrated) whereby pulling the arm 10 by means of the flexible wire connected to the end 12.

In this description and in the claims which follow, the expressions "inner plate" and "outer plate" refer to the usual assembly condition of the front bicycle derailleur. According to the traditional assembly arrangement, the set of chainrings associated to the bottom bracket of the bicycle is arranged to the right of the bicycle frame, with the largest diameter chainring arranged on the outside and the smallest diameter chainring arranged on the inside. Similarly, the fork 4 presents an inner plate 5 facing the bicycle frame and an outer frame 6 facing outwards with respect to the bicycle.

It is essential to note that during the front derailleur operation, one of the two plates 5, 6 of the derailleur pushes the chain laterally to shift it from the chainring is it meshed with to the next chainring. More precisely, the lateral pushing action of the chain is exerted by the inner plate 5, when the chain is shifted from a smaller diameter chainring to a larger diameter chainring, and by the outer plate 6, when the chain is shifted from a larger diameter chainring to a smaller diameter chainring.

SUMMARY OF THE INVENTION

The objective of this invention is to make a front bicycle derailleur fork which is capable of working efficiently and reliably in all conditions of operation of the derailleur and which is simple and lightweight at the same time.

To attain this objective, this invention relates to a fork of the type illustrated at the beginning of this description, characterised in that said outer plate and said inner plate are two separate elements made of different materials. Preferably, the material of the inner plate is stiffer and harder and the material of the outer plate is lighter.

The fork according to this invention differentiates from those made according to the traditional technique, which are typically made of a single pressed and bent metal part.

Studies and experiments conducted by the Applicant have ascertained that the fork structure can be optimised, both in terms of simplicity and lightness, considering that, for the reasons illustrated above, the outer plate and the inner plate of the fork are called to perform different tasks. In practice, while a relatively stiffer and harder material is needed for the inner plate, since this plate is called to perform the more difficult task of shifting the chain "up" from a smaller diameter chainring to a larger diameter chainring, the material chosen for the outer plate can be softer and lighter.

According to a preferred form of embodiment, the inner plate of the fork according to this invention is made of light alloy, while the outer plate is made of fibre-reinforced synthetic resin, for example carbon fibre-reinforced synthetic resin.

In a first form of embodiment, the element forming the outer plate incorporates a rear bridge, connecting the rear ends of the inner plate and of the outer plate. In an alternative form of embodiment, on the other hand, a third element, which is separate from the two elements forming the inner plate and the outer plate, forms said rear connection bridge between the two plates.

The two elements forming the inner plate and the outer plate preferably incorporate respective upper plates, which overlap and are joined to form said upper connection bridge, the elements defining the outer plate and the inner plate being connected by said overlapping plates forming the upper bridge and by the rear ends, either directly, as in the case of the first form of embodiment described above, or indirectly, by means of the third element forming the rear connection bridge, in the case of the second form of embodiment described above.

In an additional form of embodiment of this invention, the inner surface of the outer plate of the fork is provided with an additional plate, projecting from the space between the inner plate and the outer plate, to locally decrease the width of this space, according to the principles specified in Italian Patent Application TO99A000792 by the Applicant.

According to another possible form of embodiment, the outer face of the outer plate can be provided with an additional anti-wear plate, made of metallic material.

BRIEF DESCRIPTION OF THE DRAWINGS

This invention will be better explained by the following detailed descriptions with reference to the accompanying figure as non-limiting example, whereas:

FIG. 1 is a perspective view of a front derailleur of a bicycle according to the traditional technique, FIG. 2 is a perspective view of a front derailleur of a bicycle according to this invention, FIG. 3 is a perspective exploded view of the fork shown in FIG. 2, FIG. 4 is a variant of FIG. 3 and FIGS. 5, 6 illustrate two additional forms of embodiments of FIG. 2.

DETAILED DESCRIPTION OF THE INVENTION

In FIGS. 2–6, the parts in common with FIG. 1 are indicated with the same reference numerals.

In the illustrated forms of embodiment, the fork 4 according to this invention presents an inner plate 5 and an outer plate 6, which are two separate elements. The inner plate 5 is made of stiffer and harder material, typically light metal alloy of the type normally used for these parts. The outer plate 6, on the other hand, is made of a light material, typically fibre-reinforced synthetic resin, for example carbon fibre-reinforced synthetic resin. The two elements forming the plates 5,6 are joined by the upper bridge 7 and the rear bridge 8. The upper bridge 7 consists of two plates 7a, 7b, which overlap (see figure 3), belonging to the two elements forming the plates 5, 6, respectively. The union is achieved by means of a rivet 30, which engages the holes 31, 32 in the plates 7a, 7b. In the case of the form of embodiment illustrated in figures 2, 3, the rear bridge 8 consists of a third element, separate from the two elements forming the plates 5, 6, and made of light alloy or composite material. As clearly visible in figure 3, the rear bridge 8 presents a general U-shaped configuration with a central part 8a and two branches 8b, 8c fastened to the rear ends of the two plates 5, 6, respectively. The branch 8b is fastened to the plate 5 by means of a screw 33, which engages a passing hole 34 in branch 8b and a threaded hole 35 in the plate 5. The branch 8c has an interlock 8c' which mates with the free end 6' of outer plate 6 to connect the inner and outer plates 5, 6 together. Alternatively, the rear end of the outer plate 6 can be fastened to the branch 8c of the bridge element 8 simply by clipping, or by means of a screw or rivet (not illustrated). The connection means herein described as non-limiting examples can be replaced by any other type of conventional connection, including adhesive.

The form of embodiment illustrated in FIG. 4 differs from that shown in FIGS. 2, 3 in that the rear bridge portion 8 is an integral part of the carbon fibre element forming the outer plate 6. For the rest, the structure of the fork is identical to that described above. In both cases, the tabs 9 and 13 belong to the metal alloy element defining the inner plate 5.

The alternative form of embodiment illustrated in FIG. 5 is essentially identical to that shown in FIGS. 2 and 3 and differs only in that the plate 6 presents an additional plate 36 on the inner face, with the purpose of locally decreasing the width of the space between the two plates 5, 6. This device taken separately is the subject of Italian Patent Application TO99A000729 by the Applicant. The purpose is to ensure the correct shifting of the chain from a smaller diameter chainring to a larger diameter chainring, also with very narrow chains, such as those currently used with shifting units presenting a high number of sprockets (for example 10) on the hub of the rear wheel of the bicycle.

Finally, the alternative form of embodiment illustrated in FIG. 6 refers to the arrangement of an anti-wear plate 37, for example made of metallic material, on the inner face of the outer place.

Thanks to the characteristics illustrated above, the fork according to this invention presents a simple structure and is extremely light in weight while, on the other hand, the fork is efficient and reliable for performing its task, so to ensure perfect operation of the derailleur.

Naturally, numerous changes can be implemented to the construction and forms of embodiment of the invention herein envisaged, all comprised within the context of the concept characterising this invention, as defined by the following claims.

What is claimed is:

1. A front derailleur for selectively derailing a transmission chain between chain rings on a bicycle having at least one down tube located adjacent the chain ring, the derailleur comprising:

an anchoring fork for mounting on a tube of the bicycle;

a fixed body rigidly attached to the anchoring fork;

a first arm, having first and second ends with the first end pivotably attached to the fixed body at a first location;

a second arm, having first and second ends with the first end pivotably attached to the fixed body at a second location displaced from the first location;

an inner plate aligned substantially parallel to the chain ring;

an inner upper bridge aligned substantially orthogonal to and attached to the inner plate at a position substantially opposite to the chain ring, and extending in a direction substantially opposite to the bicycle tube;

a first pair of substantially parallel tabs, rigidly attached to the inner upper bridge and aligned substantially orthogonal thereto, extending in a direction substantially opposite the chain ring, the first pair of tabs pivotably attached to the second end of the first arm;

a second pair of substantially parallel tabs, rigidly attached to the inner plate and aligned substantially orthogonal thereto, extending in a direction substantially toward the tube, the second pair of tabs pivotably attached to the second end of the second arm;

an outer plate aligned substantially parallel to the inner plate and spaced from the inner plate;

an outer upper bridge, rigidly attached to the outer plate and aligned substantially orthogonal thereto, located at an end of the outer plate substantially opposite to the at least one chain ring, and extending in a direction substantially toward the bicycle tube, the outer upper bridge being removably fastened to the inner upper bridge;

a solid plate rear bridge, extending between the inner and outer plates, removably fastened to an end of the inner plate substantially farthest from the inner upper bridge.

2. The derailleur according to claim 1, wherein the rear bridge is rigidly attached to the outer plate.

3. The derailleur according to claim 1, wherein the outer upper bridge and the outer plate are composed of a light plastic composite material, and wherein the inner plate, the inner upper bridge, and the first and second pair of tabs are composed of a stiffer and harder metallic material.

4. The derailleur according to claim 1, wherein the solid plate rear bridge includes a free end which engages an end of the outer plate by means of a cooperating interlocking portion.

5. The derailleur according to claim 1, wherein inner upper bridge includes a first aperture and the outer upper bridge includes a second aperture whereby the outer upper bridge is removably fastened to the inner upper bridge by means of a first fastener extending through the first and second apertures.

6. The derailleur according to claim 5, wherein the rear bridge includes a third aperture and the inner plate includes a fourth aperture whereby the rear bridge is removably fastened to the inner plate by means of a second fastener extending through the third aperture and the fourth aperture, and wherein the rear bridge includes a member extending parallel to the outer plate and contacting the outer plate.

7. The derailleur according to claim 1, wherein the rear bridge includes a third aperture and the inner plate includes a fourth aperture whereby the rear bridge is removably fastened to the inner plate by means of a fastener extending through the third aperture and the fourth aperture.

8. The derailleur according to claim 7, wherein the rear bridge is rigidly attached to the outer plate.

9. A bicycle front derailleur fork, for use with a bicycle derailleur mountable on a bicycle having at least one chain ring, the derailleur having an anchoring fork for mounting on a tube of the bicycle, a fixed body rigidly attached to the anchoring fork, a first arm having first and second ends with the first end pivotably attached to the fixed body, a second arm having first and second ends with the first end of the second arm pivotably attached to the fixed body, the derailleur fork comprising:

an inner plate for alignment substantially parallel to the at least one chain ring;

an inner upper bridge, rigidly attached to the inner plate and aligned substantially orthogonal thereto, located on an end of the inner plate substantially opposite to the at least one chain ring, and extending in a direction substantially opposite to the bicycle tube;

a first pair of substantially parallel tabs, rigidly attached to the inner upper bridge and aligned substantially orthogonal thereto and extending in a direction substantially opposite the chain ring, the first pair of tabs for pivotal attachment to the second end of the first arm;

a second pair of substantially parallel tabs, rigidly attached to the inner plate and aligned substantially orthogonal thereto and extending in a direction substantially toward the tube, the first pair of tabs for pivotal attachment to the second end of the second arm;

an outer plate aligned substantially parallel to the inner plate and located opposite to the bicycle tube;

an outer upper bridge, rigidly attached to the outer plate and aligned substantially orthogonal thereto, located at an end of the outer plate substantially opposite to the at least one chain ring, and extending in a direction substantially toward the bicycle tube, the outer upper bridge being removably fastened to the inner upper bridge;

a solid plate rear bridge, extending between the inner and outer plates, removably fastened to an end of the inner plate farthest from the inner upper bridge.

10. The derailleur fork according to claim 9, wherein inner upper bridge includes a first aperture and the outer upper bridge includes a second aperture whereby the outer upper bridge is removably fastened to the inner upper bridge by means of a first fastener extending through the first and second apertures.

11. The derailleur fork according to claim 10, wherein the rear bridge includes a third aperture and the inner plate includes a fourth aperture whereby the rear bridge is removably fastened to the inner plate by means of a second fastener extending through the third aperture and the fourth aperture.

12. The derailleur fork according to claim 11, wherein the outer upper bridge and the outer plate are composed of a light plastic composite material, and wherein the inner plate, the inner upper bridge, and the first and second pair of tabs are composed of a stiffer and harder metallic material.

13. A derailleur fork for selectively derailing a transmission chain between chain rings on a bicycle having at least one down tube, located adjacent to the chain rings, that provides an attachment point for fixedly mounting a rigid derailleur body to the down tube, the derailleur fork comprising:

an inner plate, attached to the fixed body at a first location so that it is aligned substantially parallel to the chain rings, having first and second ends and an inner upper bridge, rigidly attached and aligned orthogonally thereto and extending in a direction away from the down tube, with one of the ends of the inner plate further defining a fastener receiving position;

a bushing overlying the fastener receiving position;

an outer plate, attached to the fixed body at a second location displaced from the first location, aligned substantially parallel to and opposite the inner plate defining a chain receiving slot between the plates, and having first and second ends and an outer upper bridge rigidly attached and aligned orthogonally thereto which extends in a direction toward the down tube by a sufficient distance to enable removable fastening to the inner upper bridge; and a rear bridge having a generally transverse portion that extends between the plates, and a first free end which defines an aperture dimensioned to overlie the bushing, so that the rear bridge extends between and connects the inner and outer plates together at opposed ends by means of a fastener that passes through the rear bridge and bushing apertures and is received in the fastener receiving position.

14. The derailleur fork according to claim 13, wherein the rear bridge is a separate piece that has a second free end with an interlocking portion that mates with the outer plate to connect the inner and outer plates together.

15. The derailleur fork according to claim 13, wherein the inner upper bridge includes a first opening and the outer upper bridge includes a second opening whereby the outer upper bridge is removably fastened to the inner upper bridge by means of a fastening member extending through the first and second openings.

16. The derailleur fork according to claim 13, wherein the outer plate is composed of a synthetic resin material and the inner plate is composed of a metallic material that is stiffer and harder than the synthetic resin material.

17. The derailleur fork according to claim 16, wherein the synthetic resin material is fiber-reinforced.

18. The derailleur fork according to claim 17, wherein the synthetic resin material is fiber-reinforced with carbon fiber.

* * * * *